A. SEPPI.
AUTOMATIC OILING NUT.
APPLICATION FILED NOV. 29, 1911.
1,052,694.
Patented Feb. 11, 1913.
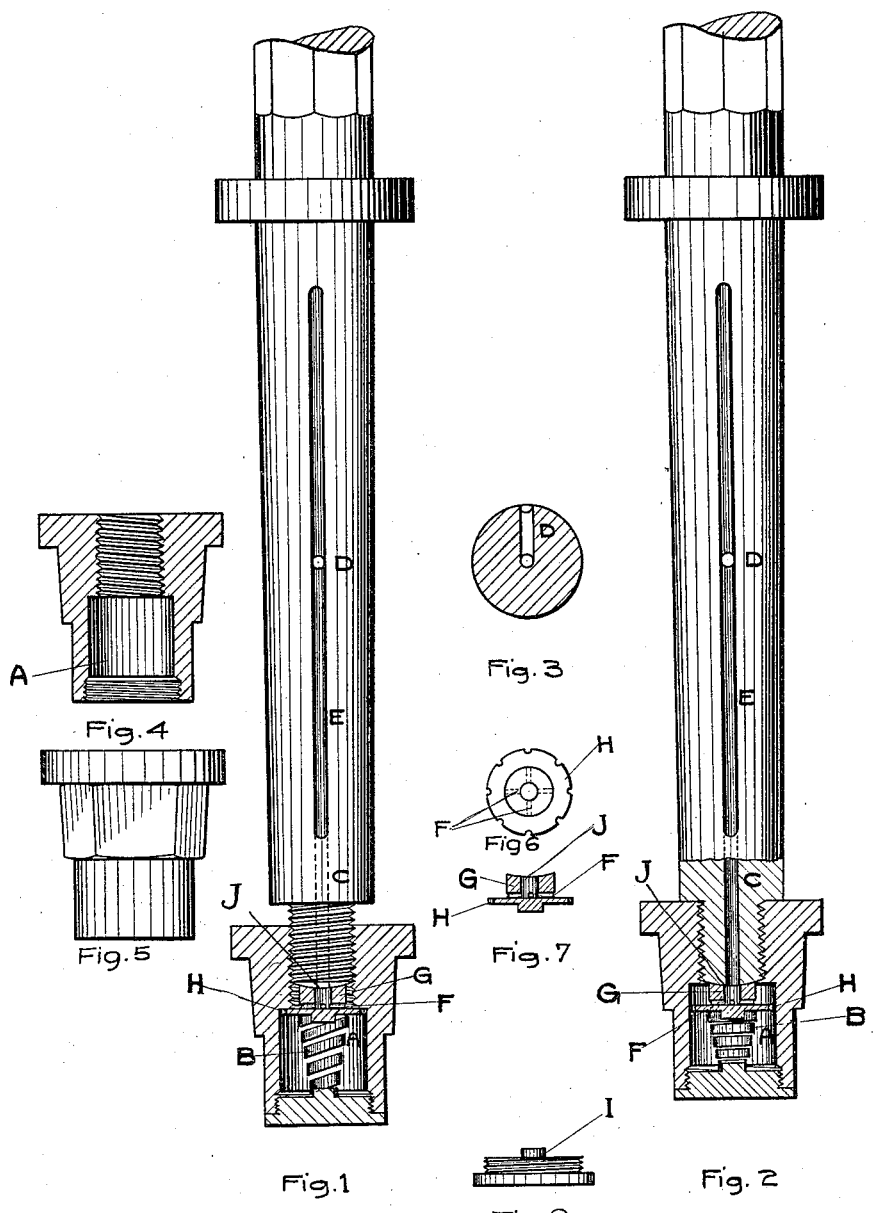

UNITED STATES PATENT OFFICE.

ALBERT SEPPI, OF ST. LOUIS, MISSOURI, ASSIGNOR OF ONE-HALF TO JOHN T. GIUS, OF ST. LOUIS, MISSOURI.

AUTOMATIC OILING-NUT.

1,052,694.  Specification of Letters Patent.  Patented Feb. 11, 1913.

Application filed November 29, 1911. Serial No. 663,131.

*To all whom it may concern:*

Be it known that I, ALBERT SEPPI, a subject of the Emperor of Austria-Hungary, residing at 1601 South Broadway, in the city of St. Louis, State of Missouri, United States of America, have invented certain new and useful improvements in automatic oiling-nut, a machine for automatically oiling the spindles and other parts of the axles of vehicles, so as to supply a uniform quantity of lubricant while the vehicle is in motion and ceasing such supply when the vehicle stops, of which the following is a full, clear, and exact description, reference being had to the accompanying drawings, forming a part thereof.

My invention relates to an improvement for storing, feeding, and conserving oil, by means of an oil carrying nut, as more fully described in the specifications, and pointed out in the claims.

In the drawings Figure 1 is a sectional view of the nut partly screwed into place. Fig. 2 is a longitudinal sectional view of the nut in place on the spindle. Fig. 3 is a cross section of the kind of spindle used in connection with the nut. Fig. 4 is a longitudinal section of the nut A. Fig. 5 is an exterior view of the nut. Fig. 6 is a front view of the valve plate H. Fig. 7 is a section of the valve plate showing perforated projection. Fig. 8 is a side elevation of a screw plug at the outer end of the nut.

My present invention consists of a combination of means whereby the following advantages are obtained, namely: (1) a reservoir for the oil; (2) a means of supplying the oil from the reservoir to the spindle in regulable quantities; and (3) a conservation of oil in applying same to the spindle; all of which will become apparent from a detailed description of my invention which is as follows:

In Figs. 1 and 2 A represents the oil chamber or reservoir and B a spring extending from the back of the nut to a check valve which it presses firmly against a ring like seat projecting inwardly from the front end of the chamber, and surrounding its outlet.

In Figs. 6 and 7 H is a valve plate, and G is a cylindrical projection elevated from the plate H at right angles, and smaller in circumference than the perimeter of the plate H. It has a circular hole J whose diameter is substantially equal to that of the hole in the spindle Fig. 2 which forms an extension of the hole in the spindle, when the cylindrical projection G is pressed against the end of the spindle. The hole J is open in front and closed at the back by plate member H. In the walls of the projection G are holes F extending from the outer surface of the projection G to the hole J in its center. The projection G is of such a length that when the nut is screwed on the spindle, projection G comes in contact with the end of the spindle, and the entire check valve (Fig. 2) is pressed backward till the plate H of the valve is pushed back from its seat.

Fig. 8 represents a cap that may be secured to the back of the nut, enabling it to be opened when required. On this cap may be placed a plug I to hold the spring in place.

In operation the nut is filled from the front by pouring the oil into the threaded cavity in front of the reservoir, and then by pressing backward on the check valve the oil is introduced into the reservoir after which the valve is permitted to resume its place against the seat. In this position the nut does not permit the oil in the reservoir to escape, no matter in what position it is placed. The nut is then screwed on the spindle until the projection G comes into contact with the end of the spindle, and the hole J thereof forms a continuation of the hole C in the spindle. The nut is then screwed on farther, the spindle pressing the valve backward from the seat, thus permitting the oil to flow between plate H and its seat out into the space between the walls of the projection G and the inner wall of the nut. From there it flows through the holes F into the hole J in the center of projection G, and from there through hole J into the hole C in the spindle through which it passes till it reaches the surface of the spindle through the orifice D and is carried along the outside of the spindle through the groove E. When the vehicle is at rest, the oil flows into and on the spindle in insignificant quantities only, but when the vehicle is in motion the vibration and bumping, together with the adhesion of the oil to the hub boxing as it revolves around the spindle, causes the oil to flow out steadily and in sufficient quantities to keep the axle well oiled, while the nut and the boxing so confine it that the oil is not lost or wasted.

The check valve shown in Figs. 6 and 7 may be composed of metal, leather, rubber or other hard stiff material. The nut cap shown in Fig. 8 is not essential, but is useful in inserting or adjusting valve or spring, and cleaning the reservoir. Plate H may be grooved as shown in Fig. 7. It is of less perimeter than the reservoir A, but takes the form of the cavity in A.

Having described my invention what I claim is:

1. In an apparatus of the class described, a nut with an oil containing reservoir and an outlet with a valve seat at its outlet; a valve controlling the outlet of said reservoir; means for automatically operating said valve, consisting of a valve plate, a hollow cylindrical projection of greater length than the space between the valve seat and the end of the spindle, apertures opening through the outer wall of said projection to the hollow thereof; means for controlling and holding the valve firmly in place; all substantially as described.

2. In an apparatus of the class described, a nut with an oil containing reservoir and an outlet, with a valve seat at its outlet; a valve within and controlling the outlet of said reservoir; means for automatically operating said valve comprising a valve plate, a hollow cylindrical projection from said plate of greater length than the space between the valve seat and the end of the spindle when the nut is in place, apertures through the wall of said projection to the hollow thereof; a removable cap at the back of said reservoir; means for controlling and holding the valve firmly in place, all substantially as described.

ALBERT SEPPI.

Witnesses:
JOHN T. GIUS,
LOUISE K. SCHUHR.

Copies of this patent may be obtained for five cents each, by addressing the "Commissioner of Patents, Washington, D. C."